United States Patent [19]

Scholtholt et al.

[11] Patent Number: 4,616,288
[45] Date of Patent: Oct. 7, 1986

[54] SURGE VOLTAGE PROTECTION MEANS FOR ATTACHMENT TO A MAIN DISTRIBUTION FRAME

[75] Inventors: Hans Scholtholt, Lohhof; Ewald Steiner, Berg, both of Fed. Rep. of Germany

[73] Assignee: Siemens Aktiengesellschaft, Berlin & Munich, Fed. Rep. of Germany

[21] Appl. No.: 581,354

[22] Filed: Feb. 17, 1984

[30] Foreign Application Priority Data

Mar. 29, 1983 [DE] Fed. Rep. of Germany ....... 3311488

[51] Int. Cl.⁴ .............................................. H05F 3/02
[52] U.S. Cl. .................................... 361/119; 361/426; 179/98; 339/66 R
[58] Field of Search ............... 361/119, 120, 415, 413, 361/426; 179/98; 339/65, 66 R

[56] References Cited

U.S. PATENT DOCUMENTS

| | | | |
|---|---|---|---|
| 3,567,998 | 3/1971 | Ammerman | 361/415 X |
| 4,071,876 | 1/1978 | Benson et al. | 361/119 |
| 4,317,154 | 2/1982 | Passarella | 361/119 |
| 4,349,237 | 9/1982 | Cobaugh et al. | 361/415 X |
| 4,439,809 | 3/1984 | Weight et al. | 361/413 X |

FOREIGN PATENT DOCUMENTS 2814018 10/1979 Fed. Rep. of Germany .

Primary Examiner—G. P. Tolin
Attorney, Agent, or Firm—Hill, Van Santen, Steadman & Simpson

[57] ABSTRACT

A surge voltage protection device for attachment to a main distribution frame having connection terminals disposed in a plurality of parallel rows and permitting non-stripped connection of electrical conductors. The device of the present invention can be built into the main distribution frame or can be added later, and includes fuse strips which contain arresters cooperating with connection terminals of the main distribution frame, the arrangement being such that the device can be applied at the front side or back side of the main distribution frame.

4 Claims, 6 Drawing Figures

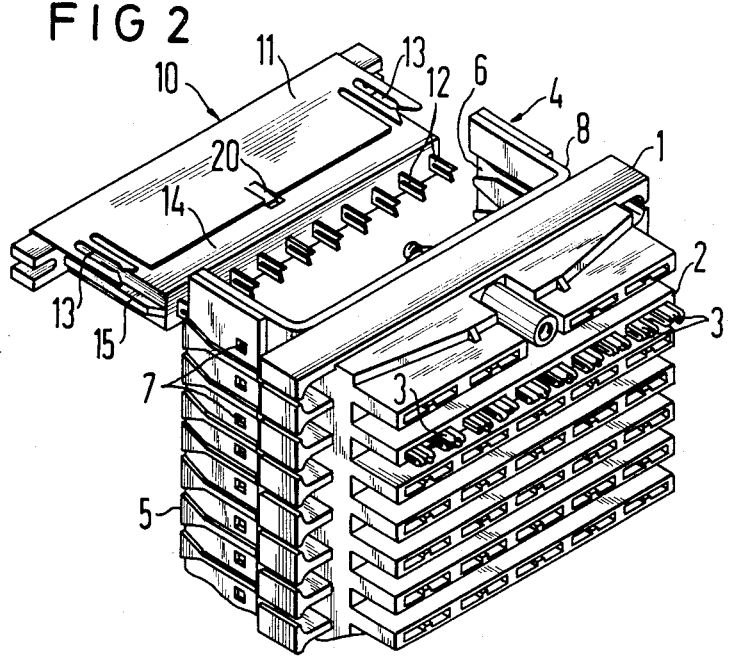
FIG 2
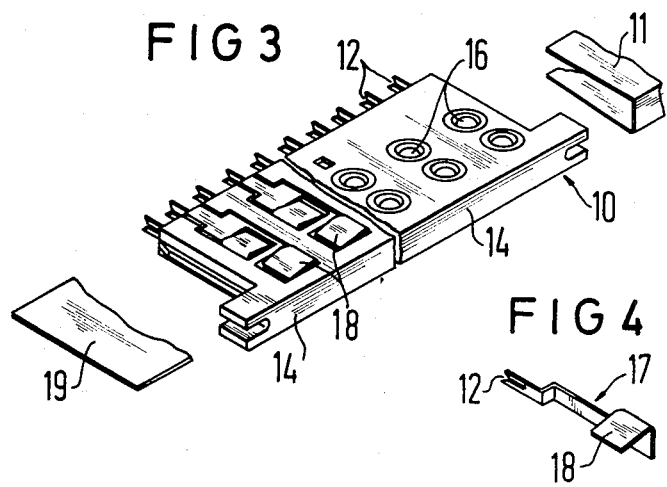
FIG 3
FIG 4

SURGE VOLTAGE PROTECTION MEANS FOR ATTACHMENT TO A MAIN DISTRIBUTION FRAME

BACKGROUND OF THE INVENTION

1. Field of the Invention

This invention is in the field of surge voltage protection devices suitable for attachment to a main distribution frame and providing for rapid engagement and disengagement without the necessity of patching.

2. Description of the Prior Art

A main distribution frame having connection terminals disposed in a plurality of parallel rows and permitting non-strip connection of electrical conductors is known, for example, from DE-OS No. 28 14 018. The provision of surge voltage protection for such a main distribution frame can only be effected at considerable cost since components containing voltage arresters must be put in by patching. As a result, additional patching wire terminals are required at the main distribution frame so that the overall terminal capacity is reduced.

SUMMARY OF THE INVENTION

The present invention provides a surge voltage protection means for attachment to a main distribution frame of the type previously described which is distinguished by a simple format and whose utilization required no additional patching measures.

In the present invention, there is provided a guide frame attachable to the main distribution frame and including fuse strips having arresters carried thereon, each fuse strip being pluggable into a sepatate row of the connection terminals, with each fuse strip in its inserted condition providing contact with each connection terminal in a row and connecting each connection terminal to ground through an arrester.

The improved surge voltage protection means of the present invention has the advantage that additional patching wire terminals are not required and a subsequent attachment of arresting devices to existing main distribution frames is possible without extensive patching. A further advantage of the improved surge voltage protection device of the present invention is that it requires no additional mounting surfaces.

One of the features of the present invention is the fact that a guide frame can be applied both to the front side as well as to the back side of the main distribution frame. When attached to the back, connection terminals are extended toward the back, and specially designed grounding elements are provided which cooperate with the connection terminals.

One of the advantages of applying the surge voltage protection means of the present invention to the back side of a main distribution frame is that patching work at the main distribution frame is not complicated by the surge voltage protection means.

BRIEF DESCRIPTION OF THE DRAWINGS

The present invention will be explained in greater detail in connection with a showing in the attached drawings in which:

FIG. 2 is an exploded view in perspective of a main distribution frame, guide frame, and fuse strip wherein the surge voltage protection device is attached to the back side of the main distribution frame;

FIG. 3 is a view in perspective, partially broken away, of a fuse strip comprising a portion of the improved surge voltage protection means; and FIGS. 4 to 6, inclusive, are perspective illustrations of further details of the surge voltage protection means according to the present invention.

DESCRIPTION OF THE PREFERRED EMBODIMENTS

Figure 1:
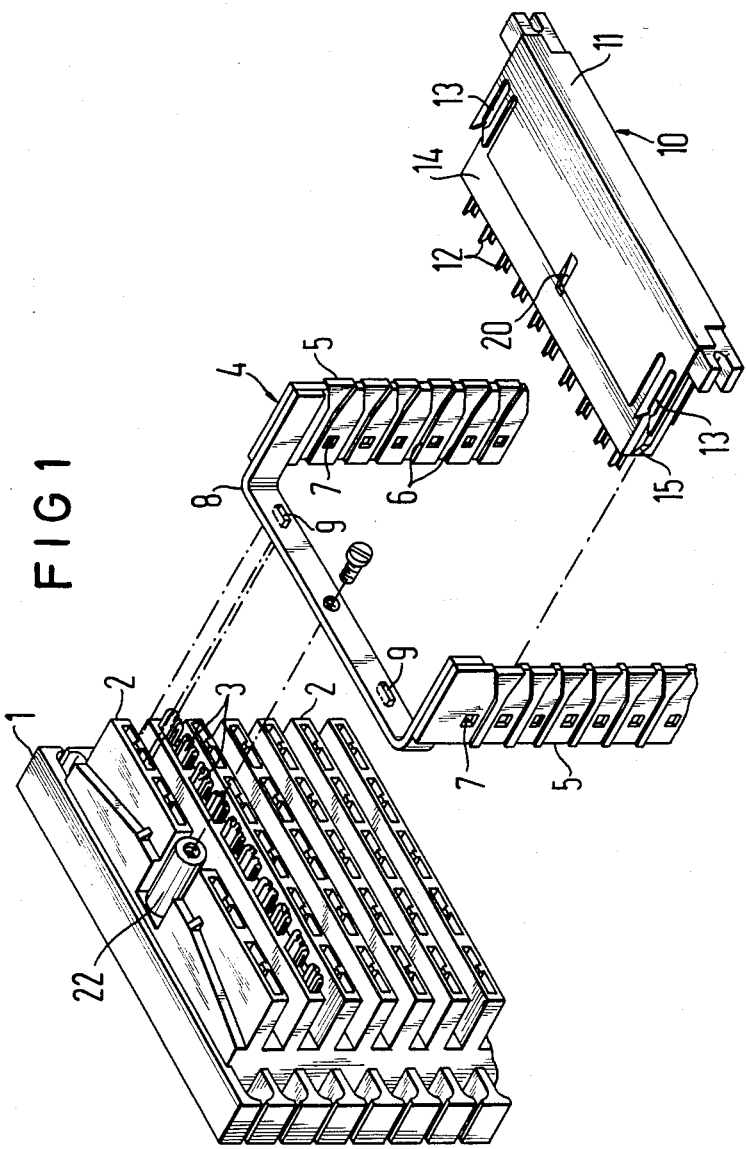
FIG. 1 is an exploded view in perspective of a main distribution frame, a guide frame, and fuse strip wherein the surge voltage protection device is attached to the front of the main distribution frame.

In FIG. 1, reference numeral 1 indicates generally a main distribution frame to which the surge voltage protection device of the present invention is to be attached. Only the upper half of the main distribution frame 1 is shown. As may be seen from FIG. 1, the main distribution frame 1 comprises a plurality of terminal rows 2 disposed in parallel relationship, each having sockets for connection terminals 3. In the illustrated example, the connection terminals 3 are in the form of dual connection terminals.

Also shown in FIG. 1 are the upper part of a guide frame 4 as well as a fuse strip 10 which carry the arresters as will be described in a succeeding portion of this specification. The guide frame 4 consists of two U-shaped fastening parts 8, only the upper fastening part being shown in FIG. 1, and also two lateral parts 5. The lateral parts 5 have inwardly disposed guide grooves 6 which have loading slopes at their front end for an improved engagement with the fuse strips 10. In the illustrated form of the invention, the two fastening parts 8 are screwed to the main distribution frame 1 and the distance between the frame and the guide frame 4 is defined by means of a spacing bushing 22. The fastening parts 8 contain centering nubs 9 which can be placed in engagement with sockets of the main distribution frame 1 and serve the purpose of centering the surge voltage protection means.

FIG. 1 also illustrates a fuse strip 10 that can be plugged into the guide frame 4. The fuse strip 10 essentially consists of an insulating member 14 and of a U-shaped grounding plate 11 mounted thereover. The exact structure of the fuse strip 10 will be explained later in connection with FIGS. 3 and 4. The insulating member 14 of the fuse strip 10 contains guide webs at its sides that engage with the guide grooves 6 of the guide frame 4 when the fuse strip 10 is inserted into the guide frame 4. Grounding contacts 13 are stamped out at the right and left on the upper side of the U-shaped grounding plate 11, the grounding contacts 13 fitting into contact openings 7 when the fuse strip 10 is plugged into the guide frame 4 and thus producing the contact between the grounding plate 11 and the guide frame 4. The metallic guide frame 4 is connected to ground potential.

Figure 6:
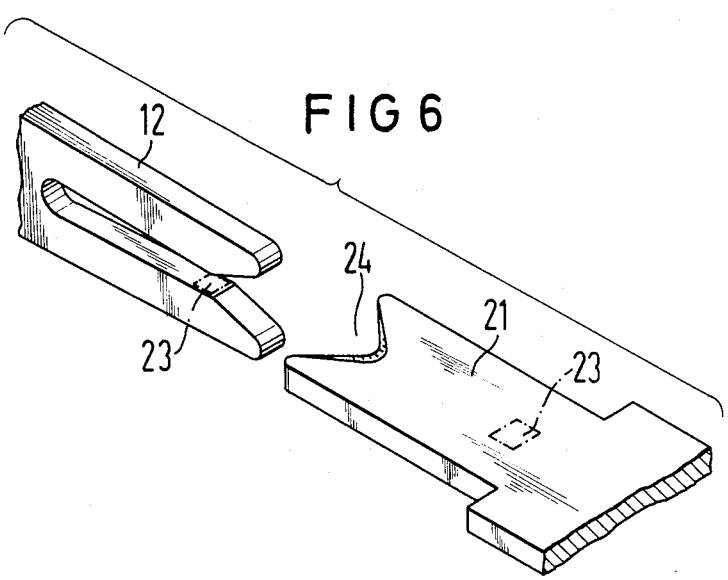

FIG. 2 illustrates the disposition of the main distribution frame 1, the guide frame 4, and the fuse strip 10 relative to each other where the surge voltage protection device is to be attached to the back of the main distribution frame 1. The structure of the guide frame 4 and of the fuse strips 10 is the same for a frontal as well as a back side attachment of the surge voltage protection means. In the case of back side attachment, it is merely necessary that the connection terminals 3 of the main distribution frame 1 be extended toward the back in order to enable connection to the fuse strip 10. A possible extension of a connection terminal 3 toward the back is indicated at reference numeral 21 in FIG. 6. This extension lies in the plane of the connection terminal 3 and is of planar configuration having a generally V-shaped forward end 24 with slanted edges therealong.

The backside attachment of the surge voltage protection device can only be subsequently implemented with difficulty, but it does enable a simpler patching to the main distribution frame 1 for a new installation of the main distribution frame.

Figure 5:
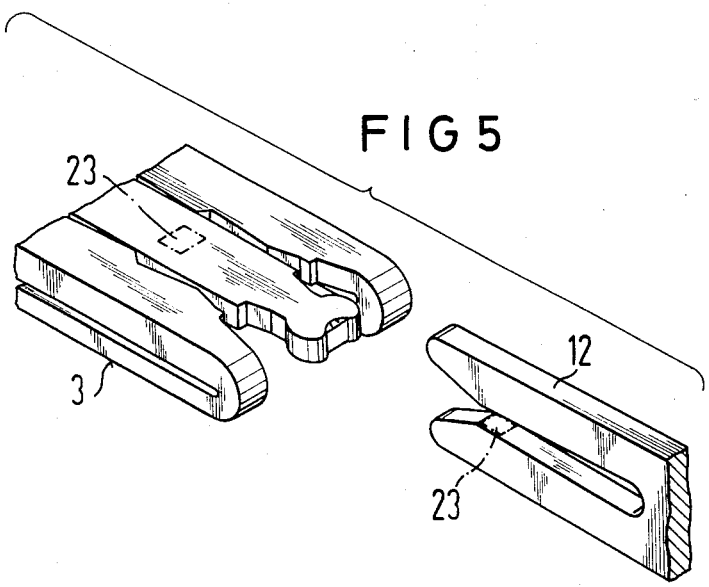

The structure of a fuse strip will be described in connection with FIGS. 3 and 4. FIG. 3 shows two broken views of the insulation member 14 whereby one view is rotated by 180° relative to the other. The insulation member 14 includes cylindrical sockets for arresters 16 as well as groove-like receptacles for grounding elements 17. The grounding elements 17 shown in FIG. 4 consist of a bifurcated end portion 12 and a spring contact plate 18 which are connected to one another by means of a web portion. The grounding element 17 is thereby dimensioned so that the grounding terminal 12 projects from the insulation member 14. The plane of the grounding terminal 12 lies parallel to a cross-sectional surface of the fuse strip 10. The result is that the planes of the grounding terminals 12 and the planes of the connection terminals 3 as well as their extensions are perpendicular to each other. This enables a simple contacting of the grounding terminals 12 to the connection terminals 3 such as shown from FIGS. 5 and 6. The contacting points between a grounding terminal 12 and a connection terminal 3 are identified at reference numeral 23 in FIGS. 5 and 6.

The web connecting the grounding terminal 12 and the spring contact plate 18 is angled twice so that the force acting on the grounding terminal 12 when the fuse strip 10 is plugged in is intercepted. The plane of the spring contact plate 18 lies essentially in the plane formed by the underside of the insulating member 14 so that the spring contact plate 18 forms a contact to an annular electrode of an arrester 16. An insulating foil 19 is disposed between the underside of the insulating member 14 and the lower part of the U-shaped grounding plate 11. After a fuse strip 10 has been plugged in, the discharge current path is as follows: the current proceeds over the incoming line, the connection terminal 3, the grounding terminal 12, the spring contact plate 18, the arrester 16, the grounding plate 11 with its lateral grounding contacts 13, and the guide frame 4 which is connected to the grounded distribution frame.

From the foregoing, it will be understood that the surge voltage protection device of the present invention is readily attachable to a main distribution frame and is characterized by a simple format as well as secure electrical contact.

It will be evident that various modifications can be made to the described embodiments without departing from the scope of the present invention.

We claim as our invention:

1. A distribution block including surge voltage protection means, and a main distribution frame, said block comprising:
   a plurality of parallel rows of connection terminals for connection of incoming and outgoing electrical wires,
   a guide frame attached to said main distribution frame and including
   fuse strips having arresters carried thereon, each fuse strip being plugged into a separate row of said connection terminals,
   each fuse strip in its inserted condition providing contact with each connection terminal in a row and connecting each connection terminal to ground through an arrester, said guide frame includes two U-shaped fastening parts, and lateral portions extending between said fastening parts, said lateral portions having inwardly disposed guide grooves receiving said fuse strips.

2. A distribution block according to claim 1 wherein:
   each fuse strip includes an insulating member,
   grounding elements connecting said connection terminals with said arresters,
   a U-shaped grounding plate having laterally disposed grounding contacts, said plate being received over said insulating member,
   said insulating member further including cylindrical socket means receiving said arresters, a receptacle with grooves extending from said socket means in the direction of said connection terminals for accommodating grounding elements, and guide webs at both its ends for engaging with said guide grooves of said guide frame.

3. A distribution block according to claim 2 wherein:
   said grounding elements each include a grounding terminal projecting out from one of said fuse strips, a spring contact plate, and a web connecting said spring contact plate with said grounding terminal, said grounding terminal having a bifurcated end located in a plane parallel to a cross-sectional surface of said fuse strip, said spring contact plates being received in said grounding terminals with their planes extending essentially in the plane of the underside of said insulating member.

4. A distribution block according to claim 3 which includes:
   an insulation foil disposed between the underside of said insulating member and said grounding plate.

* * * * *